(12) United States Patent
Miller

(10) Patent No.: US 8,150,108 B2
(45) Date of Patent: Apr. 3, 2012

(54) SYSTEMS AND METHODS OF IDENTIFICATION BASED ON BIOMETRIC PARAMETERS

(75) Inventor: David R. Miller, Morgan, UT (US)

(73) Assignee: Ensign Holdings, LLC, Salt Lake City, UT (US)

( * ) Notice: Subject to any disclaimer, the term of this patent is extended or adjusted under 35 U.S.C. 154(b) by 1052 days.

(21) Appl. No.: 12/050,077

(22) Filed: Mar. 17, 2008

(65) Prior Publication Data
US 2009/0232361 A1 Sep. 17, 2009

(51) Int. Cl.
G06K 9/00 (2006.01)
G06K 9/62 (2006.01)
G05B 19/00 (2006.01)

(52) U.S. Cl. ...... 382/116; 382/224; 340/5.53; 340/5.83; 902/3

(58) Field of Classification Search ............ 382/124, 382/116, 224; 340/5.52, 5.83; 902/3
See application file for complete search history.

(56) References Cited

U.S. PATENT DOCUMENTS

| | | |
|---|---|---|
| 4,109,237 A | 8/1978 | Hill |
| 4,537,484 A | 8/1985 | Fowler et al. |
| 4,544,267 A | 10/1985 | Schiller |
| 4,582,985 A | 4/1986 | Lofberg |
| 4,614,861 A | 9/1986 | Pavlov et al. |
| 4,699,149 A | 10/1987 | Rice |
| 4,728,186 A | 3/1988 | Eguchi et al. |
| 4,784,484 A | 11/1988 | Jensen |
| 4,846,190 A | 7/1989 | John |
| 5,036,279 A | 7/1991 | Jonsen |
| 5,073,950 A | 12/1991 | Colbert et al. |
| 5,077,803 A | 12/1991 | Kato et al. |
| 5,088,817 A | 2/1992 | Igaki et al. |
| 5,103,486 A | 4/1992 | Grippi |
| 5,152,288 A | 10/1992 | Hoenig et al. |
| 5,172,698 A | 12/1992 | Stanko |
| 5,180,901 A | 1/1993 | Hiramatsu |
| 5,230,025 A | 7/1993 | Fishbine et al. |
| 5,311,867 A | 5/1994 | Kynor |
| 5,325,862 A | 7/1994 | Lewis et al. |
| 5,335,288 A | 8/1994 | Faulkner |
| 5,456,256 A | 10/1995 | Schneider et al. |
| 5,526,808 A | 6/1996 | Kaminsky |
| 5,586,171 A | 12/1996 | McAllister et al. |
| 5,623,552 A | 4/1997 | Lane |
| 5,632,272 A | 5/1997 | Diab et al. |

(Continued)

FOREIGN PATENT DOCUMENTS

EP 1 916 615 A1 4/2008

(Continued)

OTHER PUBLICATIONS

Kachigan, Sam Kash, "Multivariate Statistical Analysis," Radius Press, 1991, 1986, 1982, 4 pgs.

(Continued)

*Primary Examiner* — Kathleen Y Dulaney
(74) *Attorney, Agent, or Firm* — John R. Thompson; Stoel Rives LLP

(57) ABSTRACT

Systems and methods for authenticating a user are disclosed. In some embodiments, information regarding multiple biometric parameters is gathered from a test subject and compared with a validation template. The validation template can be augmented with some or all of the information if the user is successfully authenticated.

19 Claims, 7 Drawing Sheets

U.S. PATENT DOCUMENTS

| | | | |
|---|---|---|---|
| 5,666,400 | A | 9/1997 | McAllister et al. |
| 5,704,352 | A | 1/1998 | Tremblay et al. |
| 5,719,950 | A | 2/1998 | Osten et al. |
| 5,737,439 | A | 4/1998 | Lapsley et al. |
| 5,771,894 | A | 6/1998 | Richards et al. |
| 5,774,571 | A | 6/1998 | Marshall |
| 5,789,733 | A | 8/1998 | Jachimowicz et al. |
| 5,793,881 | A | 8/1998 | Stiver et al. |
| 5,872,834 | A | 2/1999 | Teitelbaum |
| 5,935,062 | A | 8/1999 | Messerschmidt et al. |
| 5,982,914 | A | 11/1999 | Lee et al. |
| 5,987,232 | A | 11/1999 | Tabuki |
| 6,088,585 | A | 7/2000 | Schmitt et al. |
| 6,104,913 | A | 8/2000 | McAllister |
| 6,104,922 | A | 8/2000 | Baumann |
| 6,148,094 | A | 11/2000 | Kinsella |
| 6,164,403 | A | 12/2000 | Wuidart |
| 6,171,112 | B1 | 1/2001 | Clark et al. |
| 6,182,892 | B1 | 2/2001 | Angelo et al. |
| 6,193,153 | B1 | 2/2001 | Lambert |
| 6,202,151 | B1 | 3/2001 | Musgrave et al. |
| 6,208,264 | B1 | 3/2001 | Bradney et al. |
| 6,219,639 | B1 | 4/2001 | Bakis et al. |
| 6,224,548 | B1 | 5/2001 | Gopinathan et al. |
| 6,225,890 | B1 | 5/2001 | Murphy |
| 6,232,874 | B1 | 5/2001 | Murphy |
| 6,266,566 | B1 | 7/2001 | Nichols et al. |
| 6,269,348 | B1 | 7/2001 | Pare, Jr. et al. |
| 6,275,806 | B1 | 8/2001 | Pertrushin |
| 6,289,453 | B1 | 9/2001 | Walker et al. |
| 6,483,929 | B1 | 11/2002 | Murakami et al. |
| 6,496,595 | B1 | 12/2002 | Puchek et al. |
| 6,532,298 | B1 | 3/2003 | Cambier et al. |
| 6,539,380 | B1 | 3/2003 | Moran |
| 6,628,809 | B1 | 9/2003 | Miller et al. |
| 6,681,029 | B1 | 1/2004 | Rhoads |
| 6,695,207 | B1 | 2/2004 | Norris, Jr. |
| 6,816,605 | B2 | 11/2004 | Rowe et al. |
| 6,819,219 | B1 | 11/2004 | Bolle et al. |
| 6,898,299 | B1 | 5/2005 | Brooks |
| 6,920,231 | B1 | 7/2005 | Griffin |
| 7,113,616 | B2 | 9/2006 | Ito et al. |
| 7,133,792 | B2 | 11/2006 | Murakami et al. |
| 7,188,362 | B2 | 3/2007 | Brandys |
| 7,214,953 | B2 | 5/2007 | Setlak et al. |
| 7,358,514 | B2 | 4/2008 | Setlak et al. |
| 2001/0033220 | A1 | 10/2001 | Stone et al. |
| 2002/0138768 | A1 | 9/2002 | Murakami et al. |
| 2002/0174347 | A1 | 11/2002 | Ting |
| 2002/0191817 | A1* | 12/2002 | Sato et al. ............... 382/118 |
| 2003/0128867 | A1 | 7/2003 | Bennett |
| 2003/0233557 | A1 | 12/2003 | Zimmerman |
| 2004/0187037 | A1 | 9/2004 | Checco |
| 2004/0240711 | A1* | 12/2004 | Hamza et al. ............ 382/118 |
| 2005/0122209 | A1* | 6/2005 | Black ..................... 340/5.52 |
| 2005/0223234 | A1 | 10/2005 | McOwan et al. |
| 2005/0267752 | A1 | 12/2005 | Navratil et al. |
| 2006/0067573 | A1 | 3/2006 | Parr et al. |
| 2006/0093190 | A1 | 5/2006 | Cheng et al. |
| 2006/0116970 | A1 | 6/2006 | Scherzer et al. |
| 2006/0171571 | A1 | 8/2006 | Chan et al. |
| 2006/0210119 | A1 | 9/2006 | Willis et al. |
| 2006/0253610 | A1* | 11/2006 | Yamada et al. ............ 709/245 |
| 2006/0270916 | A1 | 11/2006 | Skwarek et al. |
| 2006/0293892 | A1 | 12/2006 | Pathuel |
| 2007/0016088 | A1 | 1/2007 | Grant et al. |
| 2007/0016777 | A1 | 1/2007 | Henderson et al. |
| 2007/0063816 | A1 | 3/2007 | Murakami et al. |
| 2007/0086630 | A1 | 4/2007 | Setlak et al. |
| 2007/0129941 | A1 | 6/2007 | Tavares |
| 2007/0192591 | A1 | 8/2007 | Yumoto et al. |
| 2008/0242231 | A1 | 10/2008 | Gray |
| 2008/0260211 | A1 | 10/2008 | Bennett et al. |

FOREIGN PATENT DOCUMENTS

| | | |
|---|---|---|
| JP | SHO 60-126787 | 7/1985 |
| JP | SHO 61-175865 | 8/1986 |
| JP | SHO 63-20583 | 1/1988 |
| JP | SHO 63-53099 | 3/1988 |
| JP | SHO 63-120385 | 5/1988 |
| JP | SHO 63-313288 | 12/1988 |
| JP | HEI 1-175362 | 12/1989 |
| JP | HEI 4-24889 | 1/1992 |
| JP | 2000-181871 | 6/2000 |
| KR | 10-2006-0076642 A | 7/2006 |
| KR | 10-2008-0044223 A | 5/2008 |
| KR | 10-2008-0073988 A | 8/2008 |
| WO | WO 88/04153 | 6/1988 |
| WO | WO 98/37519 | 8/1998 |

OTHER PUBLICATIONS

Hayes, Matthew J., et al., "Quantitative Evaluation of Photoplethysmographic Artefact Reduction for Pulse Oximetry," Optical Engineering Group, Department of Electrical and Electronic Engineering, Loughborough University, Loughborough, Leicestershire, LE11 3TU, UK, SPIE vol. 3570,Sep. 1, 1998, 14 pgs.

Scholz, Udo, J., "Multivariate Spectral Analysis of the Beat-to-Beat Sampled Cortical NIRS-Signals and the Heart Rate Variability," Department of Neurology, Charite, Humboldt University, Berlin, Germany, SPIE vol. 3566, Sep. 1998, 6 pgs.

Hoeksel, S.A., et al., "Detection of Dicrotic Notch in Arterial Pressure Signals," Department of Anesthesiology, Cardiovascular Research Institute Maastricht, Maastricht University, The Netherlands, www.medscape.com, 1997, 1 pg.

Cysewska-Sobusiak, Anna, "Noninvasive Monitoring of Arterial Blood Oxygenation with Spectrophotometric Technique," Institute of Electronics and Communications, Technical University of Poznan, Piotrowo 3a, PL-60-965 Poznan, Poland, SPIE vol. 1711, 1992, 14 pgs.

"Artificial Pacemaker," Wikipedia, the free encyclopedia, 3 pgs.

"Type: Rate-Responsive Pacing Systems," Medtronic, 1 pg.

Leichter, I., et al., "Effect of Age and Sex on Bone Density, Bone Mineral Content and Cortical Index," Energy Citations Database (ECD)—Energy and Energy-Related Bibliographic Citations, May 1, 1981, 2 pgs.

Miller, Paul D., M.D., "Increased Age is a Risk Factor," "Assessing Fracture Risk: Which Factors are Clinically Most Important?" 4 pgs.

Smith, SL, "Attribution of Hand Bones to Sex and Population Groups," Journal of Forensic Sciences, vol. 41, Issue 3, www.astm.org/cgi-bin/SoftCart.exe/JOURNAL/FORENSIC/PAGES/JFS41396046, May 1996, printed Jan. 14, 2007, 1 pg.

Jain, Anil K., et al., "Multibiometric Systems," Communications of the ACM, Jan. 2004, vol. 47, No. 1, pp. 34-40.

Office Action for U.S. Appl. No. 09/758,836, filed Jan. 10, 2001, mailed from USPTO Feb. 4, 2009, 15 pgs.

Office Action for U.S. Appl. No. 10/300,659, filed Nov. 19, 2002, mailed from USPTO Jul. 7, 2009, 11 pgs.

Office Action for U.S. Appl. No. 10/300,659, filed Nov. 19, 2002, mailed from USPTO Jan. 20, 2010, 14 pgs.

Office Action for U.S. Appl. No. 10/300,659, filed Nov. 19, 2002, mailed from USPTO Jul. 6, 2010, 17 pgs.

Office Action for U.S. Appl. No. 12/125,740, filed May 22, 2008, mailed from USPTO Jul. 9, 2010, 20 pgs.

Office Action for U.S. Appl. No. 12/563,937, filed Sep. 21, 2009 mailed from USPTO Sep. 9, 2010, 21 pgs.

Office Action for U.S. Appl. No. 12/563,941, filed Sep. 21, 2009, mailed from USPTO Oct. 28, 2010, 22 pgs.

Office Action for U.S. Appl. No. 09/814,607, filed Mar. 22, 2001, mailed from the USPTO on Dec. 19, 2008, 14 pgs.

Biel, Lena et al., "ECG Analysis: A New Approach in Human Identification," IMTC/99. Proc. of the 16th IEEE Instrumentation and Measurement Technology Conf., vol. 1, 1999, pp. 557-561.

Office Action for U.S. Appl. No. 09/815,885, filed Mar. 23, 2001, mailed from the USPTO on Mar. 17, 2008, 12 pgs.

Office Action for U.S. Appl. No. 10/300,659, filed Nov. 19, 2002, mailed from the USPTO on Dec. 27, 2007, 15 pgs.

Office Action for U.S. Appl. No. 09/758,836, filed Jan. 10, 2001, mailed from the USPTO on Apr. 17, 2007, 12 pgs.

Office Action for U.S. Appl. No. 09/758,836, filed Jan. 10, 2001, mailed from the USPTO on Jul. 23, 2008, 16 pgs.
Office Action for U.S. Appl. No. 12/563,941, filed Sep. 21, 2009, mailed from USPTO Apr. 13, 2011, 20 pgs.
Office Action for U.S. Appl. No. 12/563,937, filed Sep. 21, 2009, mailed from USPTO May 24, 2011, 20 pgs.
Office Action for U.S. Appl. No. 12/563,933, filed Sep. 21, 2099, mailed from the USPTO Jun. 14, 2011, 12 pgs.

International Search Report and Written Opinion for PCT/US2010/048696 with international fling date of Sep. 14, 2010, mailed May 24, 2011, 8 pgs.
International Search Report for PCT/US09/31638, filed Jan. 22, 2009, mailed Mar. 6, 2009, 12 pgs.

\* cited by examiner

SYSTEMS AND METHODS OF IDENTIFICATION BASED ON BIOMETRIC PARAMETERS

TECHNICAL FIELD

The disclosure relates generally to systems and methods of identification, and relates more particularly to systems and method of identification based on one or more biometric parameters.

BRIEF DESCRIPTION OF THE DRAWINGS

The written disclosure herein describes illustrative embodiments that are non-limiting and non-exhaustive. Reference is made to certain of such embodiments that are depicted in the figures, in which.

DETAILED DESCRIPTION OF PREFERRED EMBODIMENTS

Figure 1:
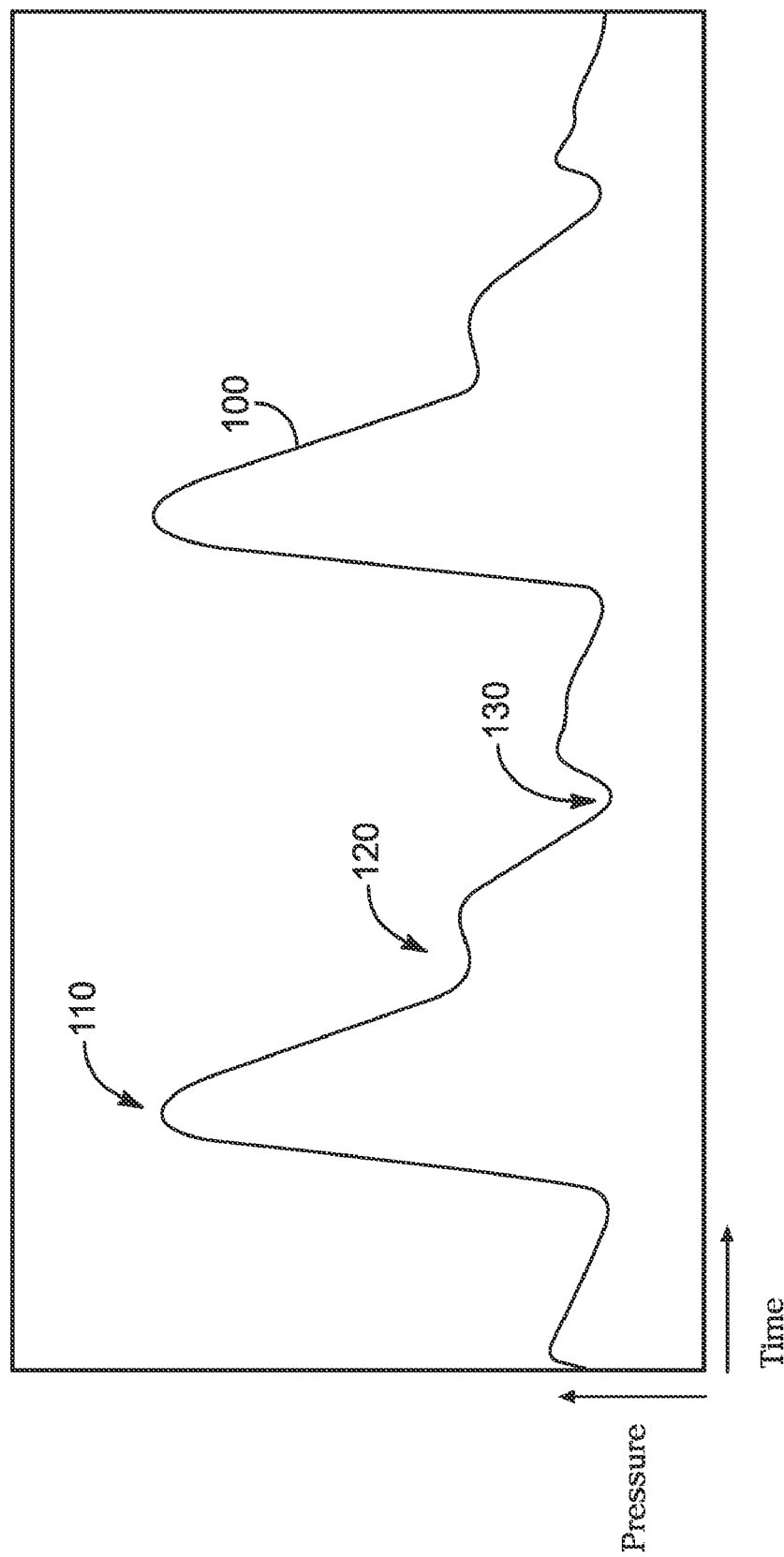
FIG. 1 is a chart depicting an illustrative cardiac cycle waveform.

Certain embodiments described herein are depicted in the drawings. It will be readily understood that components of the methods and systems that are generally described in the written description and those illustrated in the drawings may be arranged and designed in a wide variety of different configurations and, for example, may be combined, interchanged, replaced, or augmented in any suitable fashion. Thus, the following detailed description of embodiments of systems and methods is not intended to limit the scope of the disclosure.

In certain embodiments, methods and systems for authentication of a user are provided that can adjust or adapt to physical changes of the user over time. For example, in some embodiments, a biometrics based algorithm can automatically track the physiological changes of the user. In further embodiments, methods and systems for authenticating a user can utilize data gathered over a period of time regarding a plurality of biometric parameters (e.g., multiple biometric markers or biometric signatures). Certain of such methods and systems can account for, compensate for, adapt to, adjust to, consider, weight, and/or utilize information regarding drifts or changes in one or more of the biometric parameters over time. In certain embodiments, a successful authentication of a user can provide the user with access to a restricted area, activity, device, etc., and may result in updating the system with information obtained from the user during the authentication. Embodiments such as those just described, as well as others, are discussed in more detail below.

In some embodiments, it can be advantageous for a user identification method or system to account for, compensate for, adapt to, adjust to, consider, weight, and/or utilize information regarding a temporal change in a biometric parameter of the user. For example, the body of a user may have one or more traits (e.g., physical traits) that change over time. Some traits of the user may change over an extended period of time, and thus can be somewhat imperceptible to the user, to other observers, etc. Other physical traits may change more rapidly, and may be more readily apparent. Some physical traits may change permanently, others may change relatively temporarily, and still others may be in continual flux. Certain embodiments can provide for accurate identifications of the user over time, even as one or more traits of the user change between identification events, as further discussed below. As used herein, the term "user" is a broad term used in its ordinary sense and can include an animal (e.g., human) test subject having measurable biological traits.

Following are examples of certain biometric parameters of a human user that may be measured for purposes of identification of the user and that, in some cases, are susceptible to changing over time. As used herein, the term "measure" and derivatives thereof are broad terms used in their ordinary sense, and can include the ascertaining, appraisal, estimation, observation, and/or recordation of an amount, quantity, figure, extent, or other quality of a feature of a user.

Some biometric parameters that can be relatively susceptible to rapid changes and/or temporary changes include body weight, heart and respiration rates, mental activity (e.g., as monitored by ECG), presence or length of facial hair, hair length, hair color (e.g., due to dying), skin color (e.g., due to tanning), voice pitch (e.g., due to a cold), etc. Examples of biometric parameters that can change over a relatively longer period of time, or that are susceptible to long term drift, include height, hair color (e.g., due to graying), basic cardiovascular condition (e.g., condition of the arteries, lungs, heart, etc.), voice pitch (e.g., long term deepening), nose size, ear size, mental capacity (e.g., dementia), dental features (e.g., color, orientation, etc.), eye color, etc.

Some biometric parameters can be affected by injury, disease, or other induced change. Drifting of or changes to the biometric parameters may be long term or short term. In some cases, the changes may be permanent, while in others, the changes may be temporary or progressive. For example, some biometric parameters may be affected by cardiovascular damage (e.g., resulting from a heart attack or heart disease), deep wounds and cuts, stroke, loss of limbs or digits, scarring, etc.

Still other biometric parameters may be relatively constant over time with little or no drift. For example, in many instances, fingerprints can be relatively constant in the absence of wounds or scars, and the DNA of a user may exhibit no drift over time.

The foregoing discussion provides examples of biometric parameters that may be measured for purposes of identifying a user and that can be compatible with certain embodiments described herein, but does not constitute a comprehensive listing of such suitable biometric parameters. Indeed, the present disclosure comprehends the use or measurement of any suitable biometric parameter or parameters that may aid in determining the identity of a user, regardless of the amount of change or drift to which such parameters may be susceptible.

By way of illustration, and not limitation, examples of biometric parameters that can be subject to both short term and long term drift, and which are compatible with embodiments described herein, can be determined from the cardiac cycle. Changing pressure within the vasculature of a user can be described, measured, and/or analyzed as a hemodynamic waveform. In general, the arterial pressure of the user fluctuates as a result of the cardiac cycle. As the atrium ventricles of the heart contract and relax (undergo systole and diastole), pressure in the arterial blood vessels correspondingly rises and falls in a wavelike manner. The resultant waveform can be measured or monitored, for example, using pressure-sensitive equipment (e.g., piezoelectric sensors) and the pressure waveform can also be converted to an electrical representation of the waveform (e.g., via an analogue-to-digital converter). In some embodiments, the waveform can be measured or monitored via electrical signals received from the body of a user.

With reference to FIG. 1, in certain embodiments, a cardiac cycle waveform 100, or hemodynamic waveform, can include characteristics that are distinct or substantially unique to a particular user. For example, the timing of systole and diastole and the opening and closing of the cardiac valves can represent distinct biometric markers or biometric signatures of a user. In some embodiments, the waveform may be a composite waveform that represents multiple events in the cardiac cycle, such as, for example, peak systolic pressure 110, the dicrotic notch 120, diastolic pressure 130, the anacrotic notch, and potentially pulse pressure.

In the cardiac cycle, when the right ventricle begins to contract and the pressure in the right ventricle builds, the pulmonic valve opens and blood is passed from the right ventricle into the pulmonary artery, and the pressure in the pulmonary artery naturally increases. As the right ventricle begins to relax, pressure in the pulmonary artery begins to drop. When the pressure in the ventricle declines sufficiently, the pulmonic valve closes and diastole begins. When the pulmonic valve closes, the decline in pressure, as reflected in the waveform 100, is interrupted by a brief upward movement in the waveform. This interruption is referred to as a dicrotic notch 120.

Likewise, a dicrotic notch can be seen in connection with the aortic valve. When the aortic valve of the heart opens, arterial pressure quickly increases. The arterial pressure increase is the result of the blood flowing out of the left ventricle and into the aorta and arteries. Pressure in the aorta and arterial system continues to rise as blood flows from the left ventricle. As the ventricle completes the contraction, pressure in the aorta begins to decrease and diastole begins. When the aortic valve closes, pressure in the aorta increases temporarily. The closing of the valve and temporary increase in pressure can also be seen in graphs of waveforms as a dicrotic notch.

In the same way the dicrotic notch marks the closing of the pulmonary and aortic valves, the anacrotic notch marks the opening of the aortic valve. As the ventricles enter the systole phase, the rising pressure in the aorta decreases momentarily as a result about the time the aortic valve opens. This event can be represented in what is referred to as the anacrotic notch of a waveform, and occurs at the opening of the aortic valve. This notch is generally visible only in central aortic pressure monitoring or in some pathological conditions such as arterial stenosis.

Dicrotic and anacrotic notches reflect the brief change in the waveform that occurs as a result of the opening and closing of the pulmonary and aortic valves. The timing and magnitude of the dicrotic or anacrotic notch can represent a substantially unique cardiovascular trait for a user. In many instances, the dicrotic notch can be more pronounced in a younger person or a person of good physical fitness than in other individuals. Accordingly, the dicrotic notch of a particular user may change over time as the user ages or wanes in health such that an identification system that does not account for temporal changes in this biometric parameter may fail to correctly identify the user. Moreover, the dicrotic notch may be a substantially unique biometric marker of the user when the user is young and healthy, but may become less unique as the user grows older or less healthy. For example, the dicrotic notch may become less pronounced over time and thus harder to distinguish, and as the dicrotic notch becomes less pronounced, it may also begin to resemble dicrotic notches of other users that are also older and/or less healthy.

Any suitable technique or device for measuring one or more biometric parameters is contemplated. For example, as discussed below, suitable techniques and devices for measuring features of the cardiac cycle may be used in certain embodiments. More generally, the present disclosure contemplates the use of any suitable technique or method configured to measure any suitable biometric parameter or parameters, including techniques and methods that are presently known in the art as well as those yet to be devised.

Figure 2:
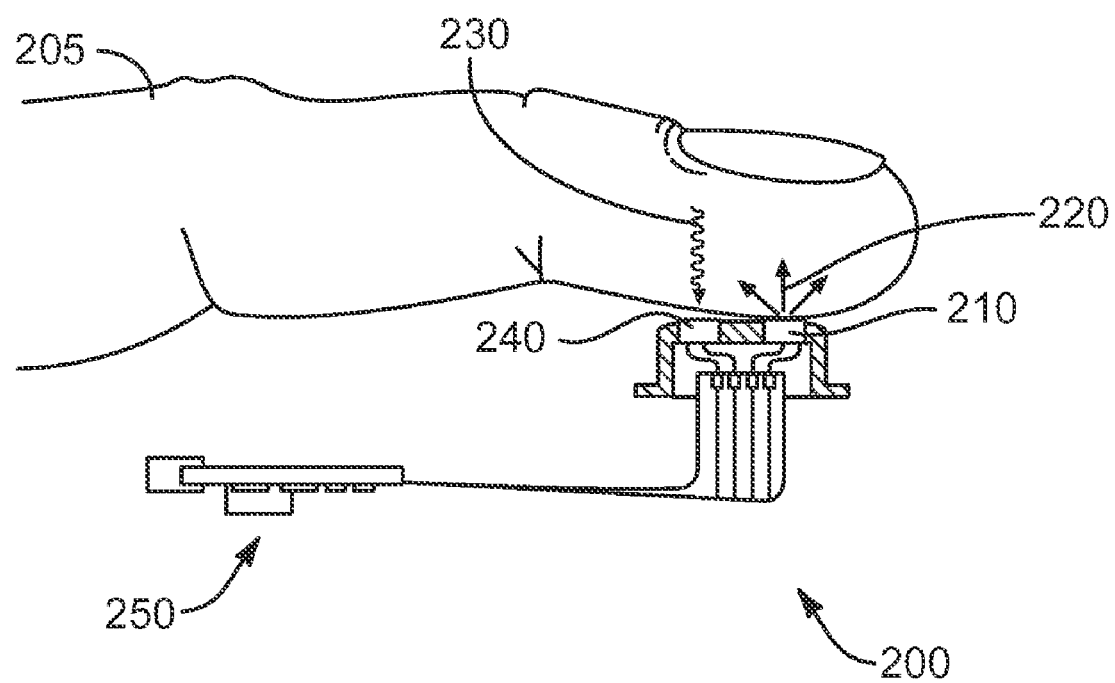
FIG. 2 is an illustration of an embodiment of a system configured to obtain measurements of the cardiac cycle of a user.

By way of example, and not limitation, FIG. 2 illustrates an embodiment of a system 200 configured to obtain measurements of the cardiac cycle of a user 205. In certain embodiments, the system 200 comprises an emitter 210 and a receiver 240, each of which can be connected to a controller 250. In some embodiments, the emitter 210 comprises an infrared light-emitting diode and the receiver 240 comprises a photoreceptor or electrical sensor. The system 200 can obtain measurements of the cardiac cycle when the user 205 or a portion thereof (e.g. a fingertip of the user 205), is in close proximity to the emitter 210 and the receiver 240.

In some embodiments, when the finger of the user 205 is in position, the controller 250 causes the emitter 210 to emit a signal 220 into the dermal and subdermal tissues of the user 205. The signal 220 can be partly absorbed and partially reflected by the tissues, as illustrated by a reflected signal 230. In some embodiments, the receiver 240 can detect reflected signals 230 and deliver information regarding the reflected signals 230 to the controller 250. In some embodiments, the controller 250 comprises a processor configured to process and/or store the information received from the receiver 240. The controller 250 can transform the information into a digital waveform representative of the cardiac cycle of the user 205. The waveform (which can resemble the waveform 100 shown in FIG. 1) can be analyzed with respect to one or more biometric markers, such as the dicrotic notch.

In other embodiments, the system 200 can be configured to operate in a transmissive, rather than reflective, manner. For example, in some embodiments, the emitter 210 can be positioned at a first side of the user 205 (e.g., a first side of a fingertip) and the receiver 240 can be positioned at a second side of the user 205 that is substantially opposite the first side of the user 205. The receiver 240 can be configured to receive portions of a signal 220 that are transmitted through tissues of a user 205, rather than reflected thereby. Other suitable arrangements are also contemplated. For example, in some embodiments, the system 200 can employ both transmissive and reflective configurations.

Additional techniques and devices that may be used to measure biometric markers associated with the cardiac cycle are disclosed in U.S. patent application Ser. No. 09/758,836, filed Jan. 10, 2001, titled DEVICE USING HISTOLOGICAL AND PHYSIOLOGICAL BIOMETRIC MARKER FOR AUTHENTICATION AND ACTIVATION, published as U.S. Patent Application Publication No. 2007/0063816; U.S. patent application Ser. No. 09/815,885, filed Mar. 23, 2001, titled METHOD AND APPARATUS FOR CHARACTERIZING AND ESTIMATING THE PARAMETERS OF HISTOLOGICAL AND PHYSIOLOGICAL BIOMETRIC MARKERS FOR AUTHENTICATION, published as U.S. Patent Application Publication No. 2007/0016088; and U.S.

patent application Ser. No. 10/300,659, filed Nov. 19, 2002, titled OBTAINING BIOMETRIC IDENTIFICATION USING A DIRECT ELECTRICAL CONTACT, published as U.S. Patent Application Publication No. 2003/0128867. The contents of each of the foregoing patent applications are hereby incorporated by reference herein and made a part of the present application.

Other techniques and devices for obtaining measurements of the cardiac cycle are also possible. Likewise, any suitable techniques for measuring other biometric parameters are possible, such as fingerprint recognition systems, voice pattern or signature recognition systems, facial feature scanners or recognition systems, vein thermal profilers, retinal scanners, iris scanners, etc. For example, in some embodiments, a pressure sensitive plate may be used to detect the ridgelines of a human fingerprint. In other embodiments, a video system can capture images of the face of a test subject and identify salient features thereof (such as eye color, facial shape, quantity and placement of hair, spacing between elements of the face, such as between the ears and eyes, etc.). In some embodiments, an optical scanner can capture an image of the blood vessel pattern of a retina of a user.

Various techniques can passively gather information from the user, and others can actively gather the information. For example, for certain systems 200, energy is actively delivered to the user 205 via the emitter 210 to permit readings to be obtained via the receiver 240. In other embodiments, a system for obtaining information from the user 205 may do so passively. For example, a video camera can capture images of the user 205 by merely receiving reflected light from the user 205, or a thermal imager may merely receive infrared radiation from the user 205.

Figure 3:
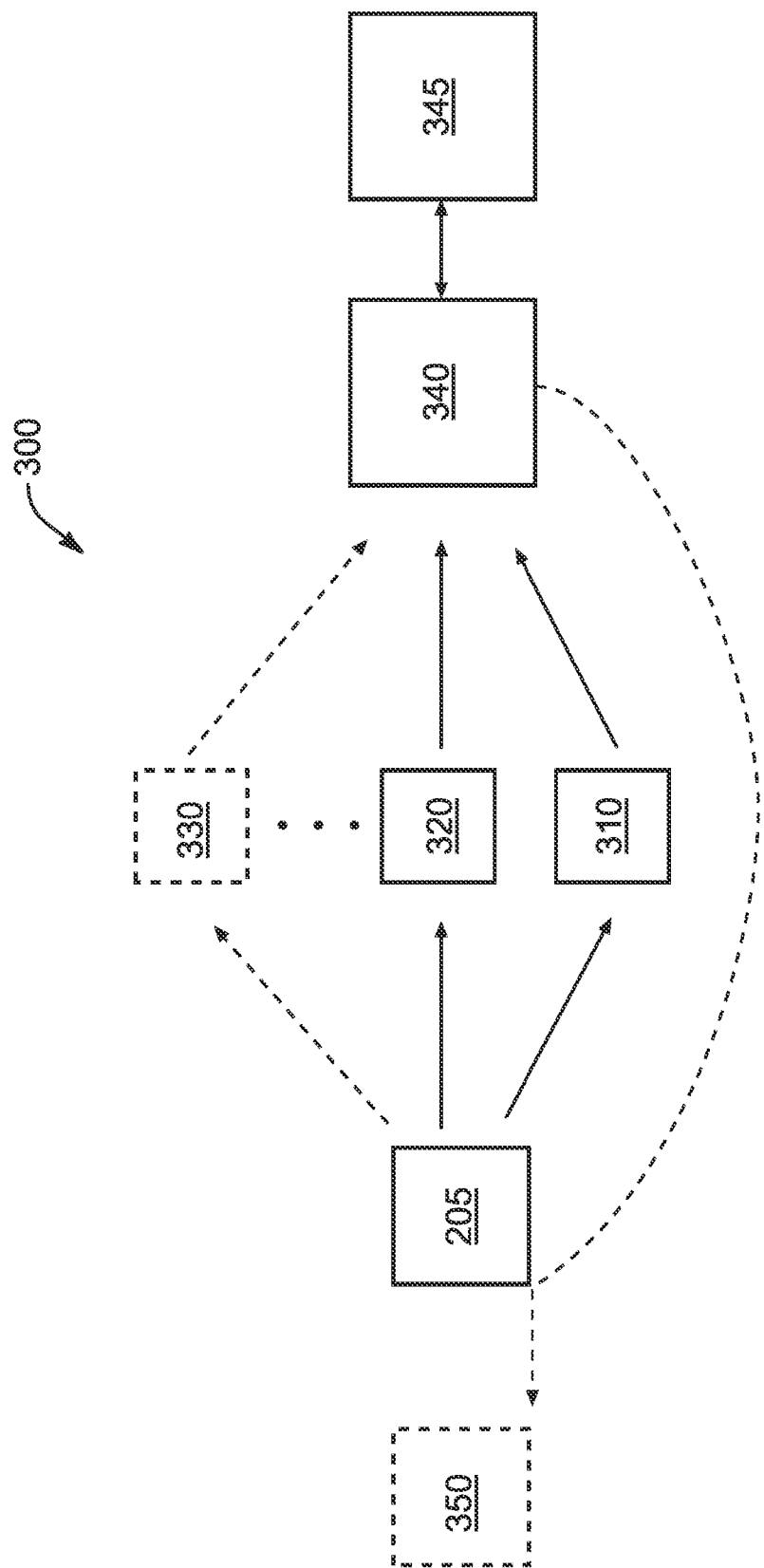
FIG. 3 is a block diagram depicting an embodiment of a user authentication system.

FIG. 3 illustrates a schematic diagram of an embodiment of a user authentication system 300, which can employ data acquisition devices such as those just described. In certain embodiments, the system 300 is configured to obtain information regarding one or more biometric parameters of a user 205 in any suitable manner and to utilize the information thus obtained to either grant or deny the user access to a restricted destination 350. As used herein, the term "destination" is a broad term, and can comprise any suitable object, item, location, place, or facility—whether physical or intangible—to which it may be desirable to restrict access. For example, the destination 350 can comprise a restricted portion of a building (e.g., a room), a secured vehicle or piece of equipment, a secured electronic device (e.g., a personal digital assistant, cell phone, etc.), secured information, a secured Internet site, a secured intranet site, a secured computer program, and/or locked hardware (e.g., computer hardware component) or hardware functionality.

In certain embodiments, the system 300 comprises a first device 310 configured to obtain information regarding a first biometric parameter of the user 205. The system 300 can further comprise a second device 320 configured to obtain information regarding a second biometric parameter of the user 205. In still further embodiments, the system 300 comprises one or more additional devices, up to and including an Nth device 330 (where N is an integer greater than 2), each configured to obtain information regarding an additional biometric parameter of the user 205. For example, in various embodiments, the first device 310 can comprise an information collection system such as the system 200 illustrated in FIG. 2, the second device 320 can comprise a pressure plate for obtaining data regarding a fingerprint, and/or an Nth device 330 can comprise a video system for capturing one or more images of the user 205. Any suitable combination of the devices 310, 320, and/or additional devices (such as the Nth device 330) is possible. Additionally, in some embodiments, a single device may be configured to gather data regarding more than one biometric parameter.

The devices 310, 320, and/or 330 can be configured to deliver information regarding one or more biometric parameters of the user 205 to one or more processors 340 and/or one or more storage devices 345. In some embodiments, the one or more storage devices 345 can comprise temporary memory, and in further embodiments, the one or more processors 340 and/or storage devices 345 can be combined in a single unit. In other embodiments, the one or more processors 340 and/or one or more storage devices 345 can be distributed over a network. In certain embodiments, the one or more storage device 345 can be configured to store the information received from the devices 310, 320, and/or 330 and the one or more processors 340 can be configured to analyze the information. Methods of and algorithms for analyzing information regarding multiple biometric parameters that can be compatible with the system 300 are discussed below.

In various embodiments, the one or more processors 340 and/or storage devices 345 can comprise one or more workstations, laptop computers, disconnectable mobile computers, servers, mainframes, clusters, so-called "network computers" or "thin clients", personal digital assistants or other hand-held computing devices, "smart" consumer electronics devices or appliances, or a combination thereof.

In some embodiments, suitable computers for use with the system 300 can include at least a processor (e.g., the processor 340) and a memory (e.g., the storage device 345); suitable computers may also include various input devices and/or output devices. The processor may include a general purpose device such as a 80×86, Pentium (mark of Intel), 680×0, or other "off-the-shelf" microprocessor. The processor may include a special purpose processing device such as an ASIC, PAL, PLA, PLD, Field Programmable Gate Array, or other customized or programmable device. The memory may include static RAM, dynamic RAM, flash memory, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

In some embodiments, one or more computers can be capable of using a floppy drive, tape drive, optical drive, magneto-optical drive, or other means to read a storage medium. A suitable storage medium can include a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing embodiments described herein can be readily provided by those of skill in the pertinent art(s) using the teachings presented herein and programming languages and tools such as Java, Pascal, C++, C, XML, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described may utilize software modules or components. A software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

As mentioned above, in some embodiments, the system 300 can comprise a network, which in further embodiments, can include one or more processors 340 and/or one or more storage devices 345. Some suitable networks for configuration and/or use with certain embodiments described herein include one or more local area networks, wide area networks, metropolitan area networks, and/or "Internet" or IP networks such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies.

Some suitable networks can include a server and several clients; other suitable networks may contain other combinations of servers, clients, and/or peer-to-peer nodes, and a given computer may function both as a client and as a server. Each network can include at least two computers such as the server and/or clients. A computer may comprise any of the features or components described above.

The network may include communications or networking software such as the software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission "wires" known to those of skill in the art or those yet to be devised. The network may encompass smaller networks and/or be connectable to other networks through a gateway or similar mechanism.

Infrastructure for implementing some embodiments of the method 300 is presently available, and can include: general purpose computers; computer programming tools and techniques; computer networks and networking technologies; digital storage media; and authentication, access control, and other security tools and techniques provided by public keys, encryption, firewalls, and/or other means.

As illustrated by at least the foregoing descriptions, the system 300 can comprise an article of manufacture, a method, a system, the product of a process, and/or a signal which configures a computer random access memory, disk, CD, DVD, or other computer-readable media.

In some embodiments, the system 300 first enrolls the user 205 and subsequently grants or deny access to the destination 350. An initial enrollment or registration of the user can comprise obtaining one or more measurements of the first biometric parameter via the first device 310, one or more measurements of the second biometric parameter via the second device 320, and/or one or more measurements of biometric parameters up to and including the Nth biometric parameter via devices up to and including the Nth device 330. In some embodiments, the one or more measurements of each biometric parameter are stored in a validation template, which, in further embodiments, can comprise a matrix. For example, in some embodiments, the validation template can comprise a data matrix that is stored within the storage device 345. In some embodiments, subsequent measurements of biometric parameters of the user 205 are compared with the validation template to determine whether or not to grant the user 205 access to the destination 350.

In some embodiments, the validation template comprises a single measurement for each biometric parameter, such as when only a single measurement of each biometric parameter is obtained during enrollment of the user 205. In other embodiments, the validation template comprises an averaged baseline dataset based on multiple measurements of each biometric parameter.

In some embodiments, an averaged baseline dataset can comprise a weighted combination or weighted fusion of the biometric parameters. The averaged baseline dataset can serve as a composite biological/biometric signature that is presumed to substantially uniquely identify the subject. An initial access attempt by the user 205 can thus be compared against the baseline dataset.

In forming the averaged baseline dataset, the biometric parameter measurements may be weighted according to a variety of weighting factors or "fusion parameters." For example, biometric parameters that are more capable of substantially uniquely identifying an individual may be given greater weight than more general parameters (e.g., fingerprint information may be weighted heavier than hair color information). Additionally, biometric parameters that are more stable during the enrollment process may be weighted heavier than biometric parameters that exhibit more fluctuation. Other weighting factors or fusion parameters are also possible, and one or more fusion parameters can be associated with each biometric parameter. In some embodiments, the fusion parameters are stored separately from the validation template in the storage device 345, such as in a separate fusion matrix and/or averaging matrix.

In some embodiments, one or more fusion parameters are based on extrinsic information, such as information obtained from sources other than measurements gathered from the user 205. For example, some fusion parameters can be based on information obtained from a general or representative human population or from a desired sample of human subjects. The fusion parameters can indicate that, in general, one variety of biometric parameter can more uniquely identify a human user than can another biometric parameter. For example, the fusion parameters may contain information indicating that the dicrotic notch is some fixed percentage more unique to users, in general, than is than hair color.

In some embodiments, the fusion parameters can be dynamically adjusted as the user successfully gains access to the destination 350. For example, as a user ages, the dicrotic notch can become less unique to that individual. As the user gains access repeatedly over time, one or more fusion parameters specific to the dicrotic notch can thus be adjusted such that the dicrotic notch is afforded less weight as the user is authenticated.

In other or further embodiments, some or all of the fusion parameters can be determined from the measurements obtained from the user 205, rather than from extrinsic sources. For example, if multiple measurements of a given biometric parameter are relatively consistent with each other, it may be determined that the biometric parameter is relatively constant for the user. In some embodiments, a fusion parameter for a biometric parameter may be based on a statistical or correlation value (e.g., the standard deviation) of the measurements of the biometric parameter such that more consistent parameters are afforded greater weight.

Fusion parameters may also be based partially on extrinsic information as well as information obtained from the user. For example, certain dynamically adjustable fusion parameters, such as discussed above, can originally be based on extrinsic information and adapted over time based on information received from the user. In some embodiments, the time at which each measurement is obtained may also be stored in the validation template and/or a fusion matrix, and can be used as a fusion parameter, as discussed further below.

In certain embodiments, once the user 205 has been enrolled and a validation template has been created, the user 205 may subsequently attempt to gain access to the destination 350 via the system 300. For such an access attempt, in some embodiments, one or more test measurements of the first biometric parameter of the user 205 are obtained via the first device 310, one or more test measurements of the second biometric parameter of the user 205 are obtained via the second device 320, and/or one or more test measurements of additional biometric parameters up to and including the Nth biometric parameter of the user are obtained via devices up to and including the Nth device 330. The test measurements are compared against the validation template, and if a sufficient match is found, the user 205 is granted access.

In some embodiments, the validation template is updated with the test measurements if the user 205 is granted access to the destination 350. In certain of such embodiments, the test measurements replace the data stored in the template such that the successful access attempt functions as a re-enrollment event. In other embodiments, the test measurements are added to the template, and can be used in conjunction with the data that was originally stored in the template.

In further embodiments, test measurement data from multiple successful access attempts are stored in the template. In certain of such embodiments, the template can be weighted according to the order in which measurements are added thereto. For example, in some embodiments, the most-recently added measurements are afforded the most weight, and the "oldest" measurements (e.g., the initial enrollment data) are afforded the least weight. In certain of such embodiments, weighting the template so as to emphasize the most recently added information can substantially guard against possible drift in any of the biological parameters of the user. Stated otherwise, the system 300 can adapt to changes to the user 205 that occur over time by providing the strongest sway to the most current measurements, which may presumably represent the current state (e.g., physiological state) of the user 205 better than other stored data. In certain of such embodiments, the system 300 can substantially protect against false rejections and promote accurate identifications of the user.

In other or further embodiments, the information stored in the template can be weighted according to the uniqueness of the various biometric parameters. As mentioned above, some biometric parameters may be better at uniquely identifying an individual than others. However, in some instances, a particular biometric parameter may become more or less unique to an individual over time. For example, at the time of initial enrollment, the diacrotic notch may correlate strongly to the individual, but as the depth of the notch softens with age, it may reach a point where its correlation is either weak or non-existent. In certain embodiments, the uniqueness or identification strength of one or more biometric parameters is assessed at each successful validation of the user 205. The biometric parameters can be re-weighted at each successful validation, and thus can adjust to and accommodate biological changes of a user 205.

Other embodiments of the system 300 are also contemplated. For example, in some embodiments, enrollment of the user 205 may be accomplished using devices other than the devices 310, 320, and/or 330, and may take place at a time and/or place far removed from the destination 350. A validation template based on the enrollment information thus obtained may be transmitted among and/or stored in one or more storage devices 345 (e.g., over a network).

Figure 4:
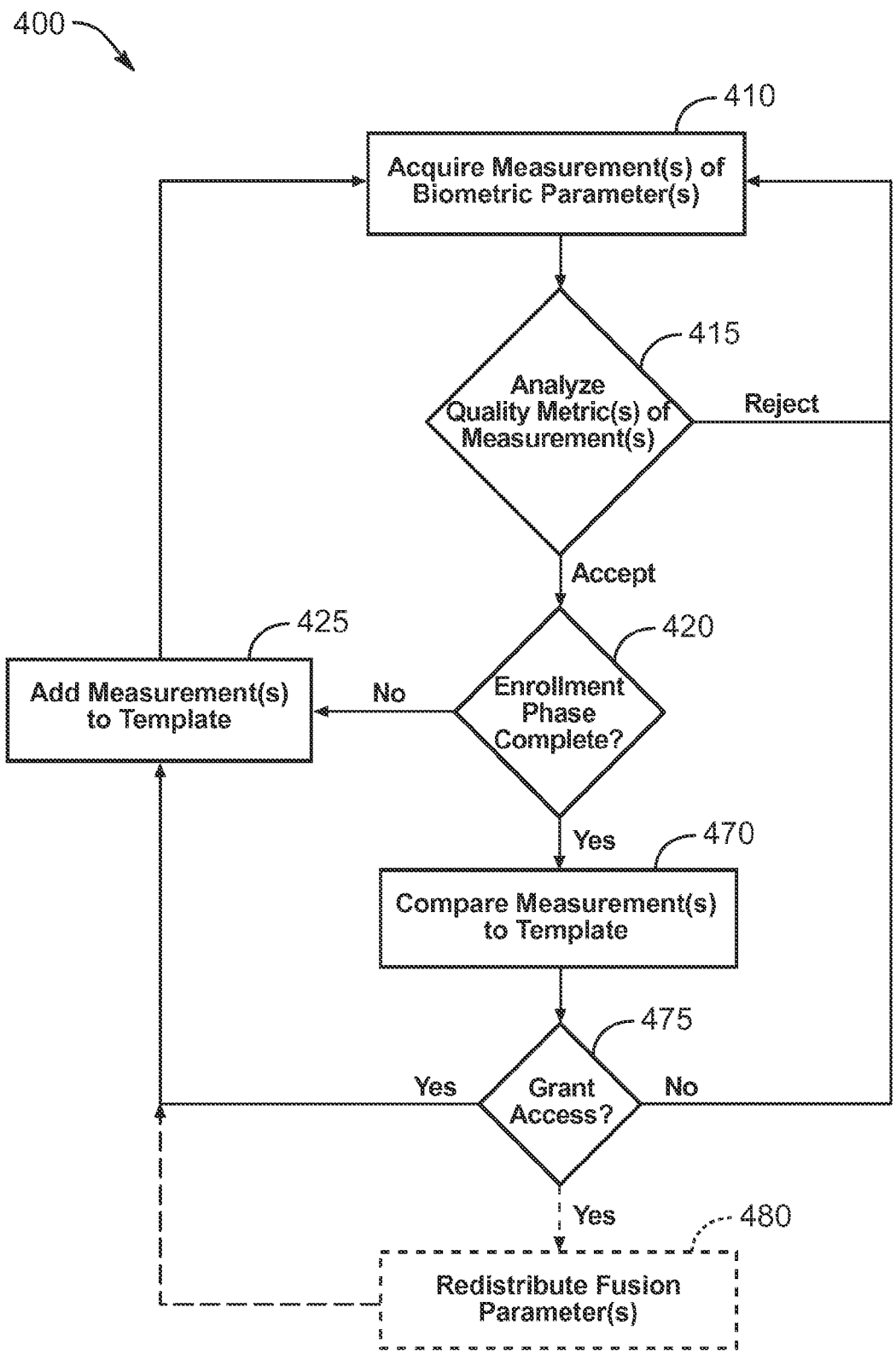
FIG. 4 is flow chart depicting an example of a method for authenticating a user.

FIG. 4 schematically illustrates an example of a method 400 of authentication compatible with embodiments of the present disclosure. For example, the method 400 can be compatible with the system 300, and one or more of the illustrated blocks of the method 400 can be implemented by one or more software modules.

At block 410, one or more measurements of one or more biometric parameters are acquired. The one or more measurements may be obtained in any suitable manner, such as by one or more measurement devices (e.g., any of the devices 310, 320, 330). In some embodiments, information in addition to measurements of biometric parameters can be obtained at block 410. The additional information can include the time at which a measurement is made and/or one or more quality metrics regarding the measurement.

At decision block 415, the one or more quality metrics of the one or more measurements are analyzed. Examples of quality metrics can include the level of completeness of the measurements, the signal-to-noise ratio of the measurements, the conformance of the measurements to an expected signature profile of the biometric, and/or the presence or absence of one or more disqualifying features in the measurements. A disqualifying feature can include, for example, a determination that one or more measurements fall outside of a range of acceptable anticipated values. For example, the one or more measurements may vary from an anticipated norm by more than an acceptable number of standard deviations (e.g., 2, 2.5, 3, etc.), or may be outside of absolute boundary that defines the anticipated limits of physical possibility (e.g., a height measurement of ten feet or greater could, in some embodiments, be disqualified). Quality metrics can indicate whether the measurements obtained at block 410 are reliable and, accordingly, whether they should be used in forming an initial validation template. Likewise, quality metrics can be used to determine whether measurements should be used in validating a user, and if so, the amount of weight that should be afforded the measurements.

If it is determined that the quality metrics of a set of measurements are acceptable, the method proceeds to decision block 420. For example, it may be determined that the signal-to-noise ratio is sufficiently large, that no disqualifying features are present, and/or that there is an acceptable level of conformance to an expected signature profile of the biometric. If the quality metrics are unacceptably poor, the measurements can be rejected and new measurements may again be obtained at block 410.

In some embodiments, the acceptable levels for the quality metrics can be predetermined or pre-selected. For example, a threshold value of a quality metric (e.g., a minimally acceptable signal-to-noise percentage) can be predetermined such that a measurement having a quality metric value or score that exceeds the threshold value will be accepted. The varieties and/or importance of the quality metrics associated with gathered biometric information may vary depending on the nature of the particular biometric parameter being measured. For example, the signal-to-noise ratio may be a more important factor in assessing the quality of a voiceprint than that of a fingerprint, in some instances, and thus may have a higher acceptability level for voiceprints than for fingerprints. In further embodiments, each biometric parameter can have a separate acceptability level or threshold value for each quality metric associated therewith. In some embodiments, if all of the quality metrics of a given measurement are above the threshold values, the measurement will be accepted, but if one or more of the quality metrics are at or below the relevant threshold values, the measurement will be rejected.

In some embodiments, at decision block 415, one or more of the measurements obtained at block 410 can be rejected based on their respective quality metrics and one or more of the measurements can be accepted based on their respective quality metrics. For example, one or more of the devices may be incapable of obtaining acceptable information from the user due to suboptimal testing conditions (e.g., it may be too dark for a facial scanner to register information regarding a user), malfunction of the device, etc. In certain of such embodiments, the method 400 can proceed based on an incomplete dataset of test measurements obtained in this manner. In some embodiments, it can be possible for an incomplete dataset to successfully authenticate a user, as further discussed below.

In other embodiments, the decision block 415 can be eliminated, such that the quality metrics are not analyzed separately from other fusion parameters. In certain of such embodiments, one or more quality metrics of a given measurement may be used in conjunction with other fusion parameters such that a given measurement may be weighted, at least in part, according to the strength of its quality metric or quality metrics.

At decision block 420, it is determined whether or not the enrollment phase has been completed. If the enrollment phase has not been completed, the measurements can be added to a validation template at block 425 and additional measurements can be acquired at block 410. In some embodiments, the measurements are only added to the validation template if the quality metrics are acceptable. If the enrollment phase has been completed, the method proceeds to block 470.

In some embodiments, at block 420, a user may be able to determine whether a sufficient or desired number of measurements have been procured such that the enrollment phase is complete. The user can thus choose to terminate the enrollment phase. In other embodiments, the enrollment phase can be completed when a predetermined level of reliability of the measurements has been achieved. For example, the enrollment phase may be terminated when it is determined that additional measurements have a statistically insignificant effect on the user profile stored in the validation profile.

In other embodiments, the method 400 does not comprise an enrollment phase. For example, in some embodiments, the one or more measurements obtained from a user at block 410 may be used initially during an authentication event, and can be compared with a template that is based on information obtained from a source other than the user.

Figure 5:
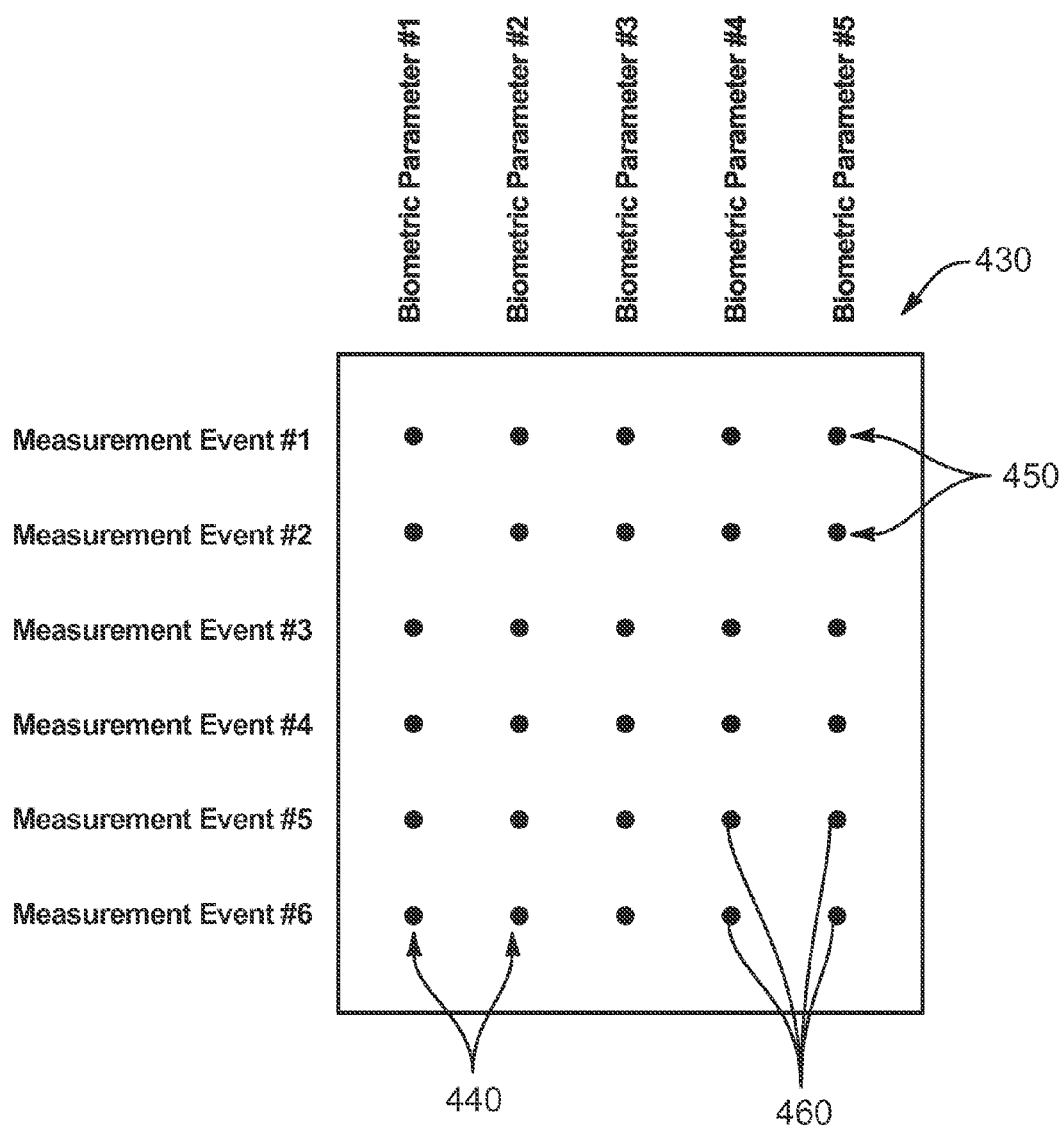
FIG. 5 is an illustration of an embodiment of an authentication template that is compatible with the method of FIG. 4.

As previously mentioned, at block 425, measurements are added to a validation template. FIG. 5 schematically depicts an embodiment of a suitable validation template 430. Other configurations for validation templates are also contemplated, and the validation template 430 is presented here for purposes of illustration. The validation template 430 comprises a plurality of columns 440, each of which corresponds to a separate biometric parameter. The template 430 further comprises a plurality of rows 450, each of which corresponds to a measurement event (e.g., a cycle through blocks 410, 415, 420, and 425 of FIG. 4). A separate dataset 460 corresponds with each column 440 and row 450. Each dataset 460 can comprise information regarding the measurement of a biometric parameter, such as, for example, one or more voltages, distances, intensities, and/or other quantitative or qualitative measurements. The datasets 460 can also include other information regarding the measurements, such as the time at which the measurements are obtained, the quality metrics of the measurements, etc.

In the illustrated embodiment, the template 430 comprises thirty datasets 460, which have been collected for five different biometric parameters during six different measurement events (e.g., at six different times). The six measurement events comprise the enrollment phase of the user 205. In other embodiments, more or fewer biometric parameters and/or enrollment measurement events are possible. As further discussed below, in some embodiments, the template 430 can comprise additional rows 450 of datasets 460 that correspond with information gathered from a user during successful validations of the user (e.g., information gathered during measurement events that result in the user successfully gaining access to a restricted destination).

The template 430 of FIG. 5 is shown schematically, and need not define a two-dimensional array of datasets 460. For example, the datasets 460 could be arranged linearly or irregularly, or could be dispersed over different locations, such as on a hard drive or over a network.

In some embodiments, fusion parameters can be included in the template 430. The fusion parameters can include, for example, information regarding the uniqueness of a biological parameter (e.g., how well the parameter distinguishes a user from other individuals), the historical stability of the biological parameter (e.g., the degree of variance among measurements of the biological parameter that are stored in the validation template), and/or one or more quality metrics of a measurement. In some embodiments, the template 430 comprises one or more additional rows and/or columns in which fusion parameters are stored. In other embodiments, one or more fusion parameters related to given measurements can be stored within the datasets 460. In still other embodiments, some or all of the fusion parameters can be stored separately from the template 430. For example, the parameters may be stored in a fusion matrix in a separate portion of a storage device (such as the storage device 345).

With reference again to FIG. 4, if it is determined at block 420 that the enrollment phase has been completed, one or more of the measurements acquired at block 410, which can be considered "test measurements," are compared with some or all of the validation template at block 470. As further discussed below, in addition to measurements that are obtained during enrollment of a user (e.g., on previous cycles through blocks 410, 415, 420, and 425), the validation template can comprise test measurements that were used to successfully identify a user 205 on previous access attempts (e.g., on previous cycles through blocks 410, 415, 420, 470, 475, 480, and 425). Accordingly, although a set of new test measurements can be compared against enrollment measurements alone in some instances, in other instances, the test measurements can be compared against any suitable combination of enrollment measurements and prior, successful test measurements stored in the validation template. Any suitable subset of a validation template may be used for comparison with test measurements. Such a subset can be referred to as a comparison dataset. A wide variety of comparison methods and techniques are contemplated for comparing a given set of test measurements with the validation template at block 470.

In some embodiments, measurements stored in the validation template are analyzed in order to compare test measurements to the validation template. For example, statistical analyses can be performed with respect to one or more of the biometric parameters represented in the validation template. In some embodiments, the measurements of a first biometric parameter are statistically analyzed to obtain a first correlation value, and in further embodiments, the measurements of a second biometric parameter are statistically analyzed to obtain a second correlation value. The measurements of additional biometric parameters can be analyzed to obtain additional correlation values. The correlation values can be indicative of the degree of conformity or agreement among the analyzed measurements. For example, in some embodiments, the correlation values comprise standard deviations. The correlation values can be obtained in any suitable manner; for example, the correlation values can be determined via application of frequency probability, eclectic probability, Bayesian probability, or fiducial probability. In some embodiments, the correlation values can be used as fusion parameters, and in further embodiments, the fusion parameters may be stored in the validation template or elsewhere.

Measurements stored in the validation template can be combined into a composite dataset based on the correlation values obtained from the statistical analyses. For example, in some embodiments, measurements of the first biometric parameter are weighted according to the first correlation value, measurements of the second biometric parameter are weighted according to the second correlation value, and/or measurements of additional biometric parameters are weighted according to additional correlation values as the measurements are combined into a composite dataset. In some embodiments, correlation values that indicate relatively large amounts of variance (e.g., larger standard deviations) can result in lighter weighting of an associated biometric parameter.

In some embodiments, the times at which (e.g., the timeframes during which) measurements are obtained can be used as a form of fusion parameter when combining measurements into a composite dataset. The times can be used instead of, in addition to, or in conjunction with the correlation values associated with the various biometric parameters. For example, in some embodiments, the statistical analyses by which correlation values of the biometric parameters are obtained may utilize, consider, or otherwise account for the times at which measurements of the biometric parameters were obtained. In some embodiments, the measurements of one or more biometric parameters are weighted according to the chronological order in which they are obtained such that newer measurements are weighted more heavily than older measurements. For example, in some embodiments, the last obtained measurements are afforded greater weight than the penultimate measurements, the penultimate measurements are afforded greater weight than the next earlier measurements, and so on. The last measurements can, for example, be given a weighting of 20%, the penultimate measurements a weighting of 15%, the next earlier measurements a weighting of 10%, and so on.

Any suitable weighting arrangement is possible. For example, it is possible to weight measurements according to a more sophisticated algorithm or formula, rather than by a fixed decrease in percentage from later measurements to earlier measurements. For example, in some embodiments, longer spans of time between measurement events can contribute to a heavier weighting of more recent measurements. In some embodiments, an algorithm can account for other fusion parameters in the time-based weighting of measurements (such as the quality metrics of one or more measurements, test measurements or measurements stored in the validation template), and may provide heavier weighting to one or more earlier measurements rather than the last-obtained measurement. In some embodiments, only a fixed number of measurements may be considered and weighted in authenticating a user. For example, in some embodiments, only the last 5, 10, or 20 measurements may be used. In other embodiments, all measurements of a biometric parameter are considered and receive at least some weight when in authenticating a user.

In further embodiments, fusion parameters can be used in combining measurements from the validation template into a composite dataset. For example, measurements can be weighted according to the quality metrics of the measurements and/or the strength of the biometric parameters as unique identifiers. The fusion parameters can be used instead of or in addition to the correlation values of the various biometric parameters and/or the times at which measurements were obtained.

In some embodiments, multivariate analysis of the validation template is performed to generate a composite dataset. For example, in some embodiments, multivariate analysis of the information contained in each biometric-parameter-specific column 440 of a template 430 (see FIG. 5) may be performed. A correlation value regarding each biometric parameter may, for example be based on both the measurement and the time of measurement of each biometric parameter. In other embodiments, multivariate analysis can be performed on the full template 430. For example, in some embodiments, a single correlation score for the information contained in all of the columns 440 and rows 450 of a template 430 may be obtained. Fusion parameters from outside of a template can also be used in performing multivariate analyses.

In some embodiments, a composite dataset obtained in any of the manners described above is compared with test measurements to obtain a confidence score or confidence level of user authentication. A confidence score can represent a degree of certainty that a set of test measurements was obtained from the same user from whom enrollment measurements (and/or additional measurements) stored in the validation template were obtained. In some embodiments, the confidence score comprises a multivariable statistical correlation score. In further embodiments the statistical correlation score can be normalized by a total possible score and expressed as a percentage, such that a 100% normalized score corresponds with an exact match between the test measurements and the composite dataset.

In some embodiments, the test measurements are combined into a separate composite dataset (also referred to as a "test measurement composite dataset") for comparison with the composite dataset derived from the validation template (also referred to as a "validation template composite dataset"). In certain of such embodiments, the test measurements can be weighted according to a variety of factors when combined into a test measurement composite dataset.

In some embodiments, the test measurements can be weighted according to correlation values derived from measurements that are contained in the validation template. For example, the validation template composite dataset can be created by weighting measurements of first, second, and/or additional biometric parameters according to first, second, and/or additional correlation values, respectively, in a manner such as described above. In certain of such embodiments, test measurements of the first, second, and/or additional biometric parameters are weighted according to the same first, second, and/or additional correlation values, respectively, when the test measurement composite dataset is formed.

In other embodiments, both the test measurements and some or all of the measurements contained in the validation template are evaluated in determining correlation values. For example, a validation template can contain measurements for a first biometric parameter, a second biometric parameter, and/or additional biometric parameters, and the test measurements may correspond to the same first, second, and/or additional biometric parameters. In some embodiments, the test measurement of the first biometric parameter and one or more measurements of the first biometric parameter stored in the validation template are statistically analyzed to obtain the first correlation value, and similar statistical analyses are performed with respect to the second and/or additional biometric parameters. In some embodiments, the test measurements are weighted according to the correlation values to obtain the test measurement composite dataset, which may be compared with the validation template. In further embodiments, the correlation values obtained in the manner just described can be used in creating a validation template composite dataset, which can be compared with the test measurements. For example, the validation template composite dataset based on the correlation values can be compared with a test measurement composite dataset that is based on the same correlation values.

In certain embodiments, statistical analyses of the test measurements that yield correlation values can utilize or account for the times at which measurements (e.g., test measurements and/or measurements stored in a validation template) are obtained. In some embodiments, the measurements are weighted according to the chronological order in which they were obtained such that more recent measurements are weighted heavier than older measurements. In other or further embodiments, the statistical analyses can be based at least in part on other fusion parameters, such as the quality metrics of the test measurements.

More generally, in some embodiments, the test data composite dataset can be based on the quality metrics of the test measurements. For example, in some embodiments, a first test measurement may be associated with a quality metric having a first value and a second test measurement may be associated with a quality metric having a second value. The first and second test measurements can be weighted according to the first and second values, respectively, as the composite dataset is formed. Test data composite datasets can likewise be based on other fusion parameters.

In some embodiments, the number of biometric parameters represented by the test measurements is considered when comparing the test measurements to the validation template. For example, as discussed above, in some embodiments, an incomplete set of test measurements may be used when some measurements have acceptable quality metrics but other measurements are rejected due to unacceptable quality metrics. In certain of such embodiments, determination of correlation scores, multivariate analysis, and other operations performed on a validation template can be based only on those biometric parameters for which there are corresponding test measurements. For example, if test measurements for only two out of three biometric parameters are accepted, the two test measurements may be compared with a subset of the validation template that is associated with the two relevant biometric parameters.

With continued reference to FIG. 4, the confidence score obtained via comparison of one or more test measurements to the validation template is evaluated at decision block 475 in order to grant or deny access to a user. In some embodiments, a user may seek access to a single restricted destination (such as a locked cell phone or computer), and a simple yes/no or go/no go evaluation can be performed. For example, if the confidence score is above a minimum threshold level, access to the destination is granted, and if the confidence score is at or below the threshold level, access is denied. In some embodiments, the threshold level and the confidence score can both be expressed as percentages.

In other embodiments, the method 400 can control access to multiple destinations. The multiple destinations can comprise, for example, separate physical locations (e.g., rooms or buildings having different levels of security clearance, such as at a military base), or different files of a computer program (e.g., a computer program having both publicly viewable and confidential files). Any other combination of multiple destinations is possible, including any combination of the destinations enumerated above with respect to the destination 350. In certain embodiments, different threshold values can be set for two or more destinations.

For example, it may be desirable to grant access to various destinations based on a single authentication event. The confidence score obtained in an authentication event can be mapped to the various destinations, and in some embodiments, can permit incremental access to a complete area or a subset of the area. In some embodiments, a first destination may be more restricted than a second destination, and a first threshold value associated with the first destination may thus be higher than a second threshold value associated with the second destination. If the confidence score is above the first threshold value, the user can be granted access to both the first and second destinations. If the confidence score is above the second threshold value but below the first threshold value, the user can be granted access to the second destination but denied access to the first destination. If the confidence score is below the second threshold value, the user can be denied access to both the first and second destinations. Other multi-level, tiered, or segmented access schemes are also contemplated. For example, access to more than two destinations can be controlled, and more than two threshold values are possible.

In some embodiments, the various threshold levels can be predetermined and may be selectable by an administrator. In further embodiments, the threshold levels can be adjustable. For example, it may be desirable to increase one or more threshold values as information-gathering devices are fine-tuned, updated, or replaced.

In some embodiments, other or additional access rules may be established. For example, in some embodiments, it may be desirable to deny access to a user if the dataset of test measurements is incomplete, even if the confidence score obtained from a comparison of incomplete dataset with the validation template is sufficient to grant the user access. In certain of such embodiments, it may be important to obtain a reliable reading of a particular set of biometric parameters so as to frustrate imposters who may be able to feign, steal, or otherwise present some, but not all, of the specific biometric parameters of a user. Accordingly, if only a fraction of the test measurements are accepted at block 415, the user may be denied access, or in the case of multi-level access, may be granted only limited or partial access. By way of illustration, a multi-level access system may require: 5 out of 10 biometric parameters to be present in a test measurement dataset in order to grant access to the a destination requiring a low level of clearance; 8 out of 10 biometric parameters to be present in the dataset for access to a destination requiring a medium level of clearance; and 10 out of 10 biometric parameters be present in the dataset for access to a destination requiring a high level of clearance.

With reference again to FIG. 4, in some embodiments, if access is granted to the user (e.g., at decision block 475), one or more of the test measurements can be stored in the validation template (e.g., at block 425). As discussed above, the test measurements thus stored in the validation template can be used in determining whether to grant access to the user in subsequent authentication events.

In some embodiments, one or more test measurements may be excluded from the validation template if the confidence score obtained in comparing test measurements with the validation template is too low. For example, in some embodiments, access may be granted to a user if a calculated confidence score meets or exceeds an authentication threshold value, but one or more measurements used in calculating the confidence score may be excluded from entry into the validation template if the confidence score is below a storage threshold value that is higher than the authentication threshold value. In some embodiments, each biometric parameter may have a separate storage threshold value. For example, in some embodiments, one or more test measurements can be stored in the validation template due to a confidence score that is above the storage threshold values of the test measurements, and one or more other test measurements can be excluded from storage in the validation template due to the same confidence score being below the storage threshold values of the other test measurements.

In some embodiments, one or more test measurements may be excluded from the validation template if the quality metrics associated with the test measurements are insufficiently reliable. For example, in some embodiments, acceptability levels may be established for one or more biometric parameters, and the acceptability levels can be different from the acceptability levels assessed at block 415 (discussed above). The acceptability levels that are evaluated for storing test measurements may be more stringent than the acceptability levels that are evaluated to determine whether test measurements will be used in compiling a confidence score for a user. For example, one or more quality metrics of a test measurement of a given biometric parameter may be compared with a first acceptability level at block 415 and the same quality metrics may be compared with a second acceptability level that is higher than the first acceptability level in determining whether to store the test measurement in the validation template. If the quality metrics exceed the first acceptability level but fall short of the second acceptability level, the test measurement is not stored in the validation template. Similarly, in some embodiments, some or all of the test measurements may be denied entry into the validation template if the dataset of test measurements is incomplete (e.g., if only a fraction of the available biometric parameters are used in granting the user access).

In some embodiments, one or more correlation values derived from the validation template and/or from one or more of the test measurements may be evaluated in determining whether one or more test measurements are to be stored in the validation template. As discussed above, in some embodiments, measurements of one or more biometric parameters stored in the validation template are statistically analyzed to obtain one or more correlation values. In further embodiments, one or more test measurements are statistically analyzed in conjunction with the measurements stored in the validation template to obtain the one or more correlation values. In some embodiments, a predetermined range of acceptable correlation values is established for a given biometric parameter, and a test measurement of the biometric parameter is only included in the validation template if the correlation value for the biometric parameter is within the predetermined range. For example, in various embodiments, the acceptable correlation values can be no more than about 0.25, 0.5, 0.75, 1.0, 1.5, 2.0, 2.5, or 3.0 standard deviations.

In some embodiments, old data is removed from the validation template as a result of the addition of new test measurements to the template. For example, in some embodiments, a template (such as the template 430 of FIG. 5) comprises only a fixed number of rows (e.g., 5, 10, 15, 20, etc. rows 450) such that data in the oldest row is removed from the template when a new row is added. In other embodiments, new test measurements can be added to the template in a substantially unlimited manner.

With reference to FIG. 4, in some embodiments, granting access to a user (block 475) can result in a redistribution of one or more of the fusion parameters (block 480). For example, fusion parameters directed to the degree of uniqueness of the biometric parameters can be altered. In some embodiments, it may be determined from information obtained in both the present validation attempt and previous successful validation attempts that a particular biometric parameter (e.g., the dicrotic notch) is becoming less unique to the user. Accordingly, the fusion parameter associated with the dicrotic notch can be altered such that in future access attempts by the user, measurements of the dicrotic notch are afforded less weight. Likewise, fusion parameters relating to the historical stability and/or accuracy of one or more of the biometric parameters can be adjusted.

As previously mentioned, in some embodiments, some or all of the fusion parameters can be contained in the validation template, such as in a fusion matrix stored within the validation template. In other embodiments, the fusion parameters can be stored separately from the validation template. Also, in some embodiments, fusion parameters can be altered as a result of any access attempt by the user, whether or not access is ultimately granted for a particular attempt.

Referring again to decision block 475 of FIG. 4, in some embodiments, additional test measurements can be obtained from the user after the user has been denied access, such as in a subsequent access attempt. In some embodiments, it may be desirable to limit the number of unsuccessful access attempts. Providing for such a limitation could, for example, reduce the likelihood of an imposter gaining unauthorized access.

As previously discussed, in certain embodiments, test measurements obtained at block 410 can be stored in a validation template when the test measurements are used to successfully authenticate a user (e.g., by a successful cycle through blocks 415, 420, 470, 475, and 425). Accordingly, in some embodiments, a validation template can include one or more measurements of a biological parameter that were obtained during enrollment, and can further include one or more test measurements of the biological parameter that were obtained in one or more prior authentication events. Moreover, new test measurements can be compared with the validation template in the same manner that a set of previous test measurements was compared with a prior version of the validation template. Validation attempts thus can be iterative. For example, in some embodiments, the validation template may be weighted according to the time at which measurements are obtained, and the weighting may be greatest for the most recently obtained measurements. Accordingly, if a first set of test measurements is added to the validation template after a successful authentication event, the first set of test measurements can receive the most weighting in a subsequent authentication event. However, if the subsequent authentication event results in a second set of test measurements being stored in the validation template, then the second set of test measurements can be weighted more heavily than the first set of test measurements in authentication events that occur after the second set of test measurements is stored in the validation template. Likewise, a subsequently added third set of test measurements can be weighted heavier than the second set of test measurements and so on.

Figure 6:
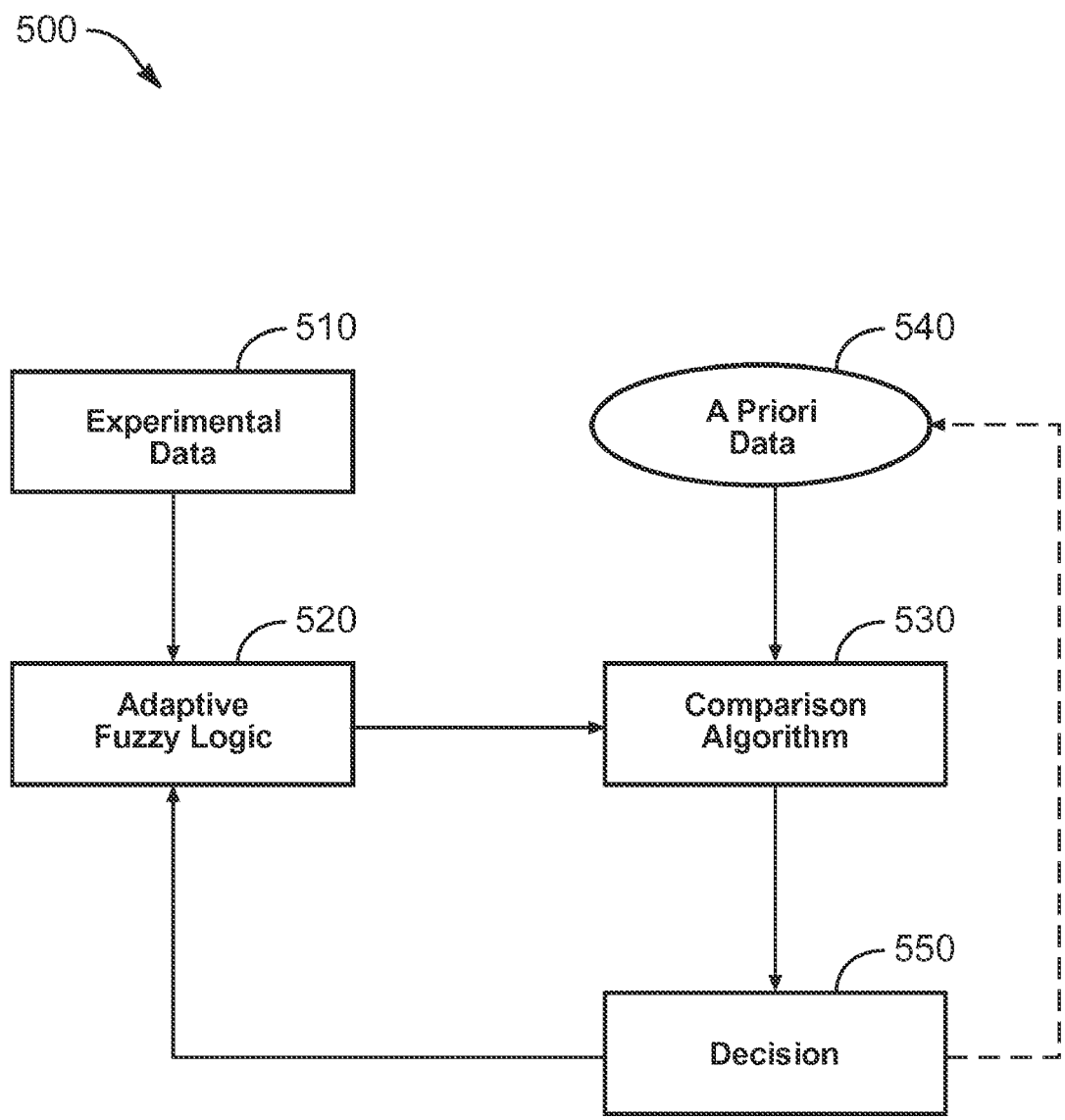
FIG. 6 is a flow chart depicting another example of a method for authenticating a user.

With reference to FIG. 6, in certain embodiments, a method 500 is configured to grant or deny a user access to a destination. At block 510, information regarding one or more biometric parameters is gathered from a user. The information, or "experimental data," is provided as input to an adaptive fuzzy logic system (block 520). Based on one or more previous access attempts by the user, the fuzzy logic system alters the experimental data and provides the altered data as input to a comparison algorithm (block 530). A priori data (block 540) is also provided as input to the comparison algorithm. The a priori data can, for example, comprise a validation template such as discussed above with respect to the method 400. Upon comparing the altered experimental data and the a priori data, the comparison algorithm renders a decision (block 550). In some embodiments, the decision can comprise a go/no-go grant or denial of access to the user. In other embodiments, the decision can grant the user with limited access, such as in a multi-level destination. The results produced by the comparison algorithm can be provided as input to the fuzzy logic system at block 520. In some embodiments, the results of the comparison algorithm are provided to the fuzzy logic system at block 520 regardless of the outcome of the decision rendered at block 550. The fuzzy logic system can use the results in future access attempts. In some embodiments, if the user is granted access at block 550, the a priori data can be augmented with the experimental data. As with the method 400, one or more blocks of the method 500 can be implemented by one or more software modules With reference to FIG. 7, in certain embodiments, a method 600 is configured to grant or deny a user access to a destination. At block 605, a number of possible outcomes are provided. In some embodiments, test measurements regarding one or more biometric parameters are gathered from a user, and each set of test measurements can correspond with a possible outcome. By way of illustration, if measurements of ten biometric parameters are obtained from a user, each measurement of a biometric parameter can correspond to a possible outcome. The possible outcomes may comprise a record, which may include information gathered from the user in prior events and/or information obtained from a general population.

In some embodiments, at block 610 it is determined what fraction of the possible outcomes will be used in determining whether to grant access to the user. For example, quality metrics of test data obtained from the user may be considered in order to determine that only a fraction of the possible outcomes are acceptable for a given measurement event. By way of illustration, in a given authentication event, if the measurements of only seven of ten biometric parameters are within an anticipated range of normalcy, there may be only seven acceptable outcomes for the authentication event. As another illustration, if measurements of only seven of ten biometric parameters have sufficiently reliable quality metrics, then there may be only seven acceptable outcomes. In some embodiments, rules may be applied at block 610 to determine whether the method 600 should proceed when only a fraction of the possible outcomes obtained at block 605 are acceptable. In some embodiments, one or more biometric measurements can be reacquired if so dictated by rules evaluated at block 610, as illustrated by a broken arrow directed from block 610 to block 605. For example, one or more unacceptable outcomes and/or one or more acceptable outcomes may be reacquired, depending on the rules employed.

In some embodiments, the acceptable outcomes, as determined at block 610, are prioritized at block 615. The prioritization can comprise weighting of the outcomes. Such weighting can be according to such factors as the relative uniqueness of a particular biometric marker. The prioritization can also be based on the quality metrics of the acceptable outcomes, either independent of or in addition to the uniqueness of the outcomes. Other suitable prioritization factors are also possible.

In certain embodiments, the method 600 can perform multidimensional or multivariate analysis on the acceptable outcomes. In various embodiments, the method 600 can analyze the outcomes in a first, second, and/or up to an Nth dimension relative to the data regarding the acceptable outcomes. For example, in some embodiments, data regarding the acceptable outcomes can be stored in a template such as the template 430 illustrated in FIG. 5. In some embodiments, a two-dimensional analysis is performed on the template 430, such that each column 440 is analyzed and each row 450 is analyzed. In other embodiments, more or fewer dimensions are analyzed. For example, each dataset 460 stored in the template 430 can comprise multiple pieces of information such that each piece of information can be analyzed separately (e.g., by column, by row, and/or by some other manner). In further embodiments, multiple different analyses can be performed on the same and/or different pieces of information contained in the datasets. The number and type of analyses performed in a given method 600 can vary as desired or as dictated by a given application.

Figure 7:
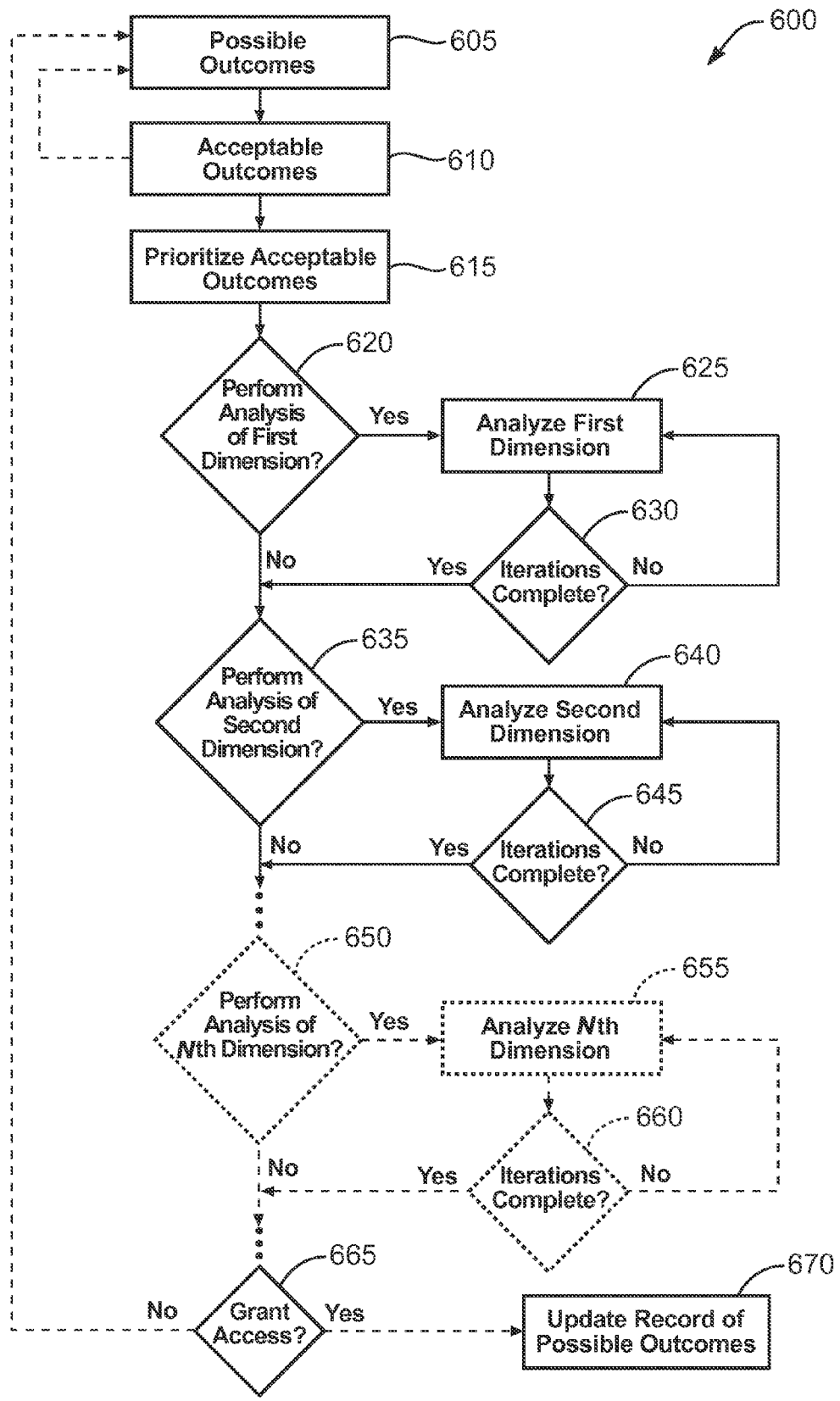
FIG. 7 is a flow chart depicting another example of a method for authenticating a user.

With continued reference to FIG. 7, at block 620, it is determined whether a first type of analysis is to be performed on the acceptable outcomes. For example, it can be determined whether an analysis of the acceptable outcomes will be performed in a first dimension. With reference again to an illustrative template 430, in some embodiments, it may be decided at block 620 whether an analysis of each column 440 should occur. If so, the method proceeds to block 625.

In certain embodiments, a statistical analysis is performed in a first dimension at block 625. For example, a single column 440 of a template 430 can be analyzed. The analysis of a given column 440 can be weighted or otherwise prioritized based on the results of block 615.

The method 600 can proceed to block 630 where it is determined whether additional iterations are to be performed. For example, if a single column 440 has been analyzed, yet additional columns of biometric data that correspond with acceptable test data are present in a template 430, the method 600 can loop back to block 625 until all of the columns have been statistically analyzed.

In some embodiments, if it is determined that analysis of the acceptable outcomes in a first dimension is not desired, or if the analysis in the first dimension is complete, the method can proceed to block 635. At block 635, it is determined whether a second type of analysis is to be performed on the acceptable outcomes. For example, it can be determined whether an analysis of each row 450 of a template 430 should occur. If so, the method proceeds to block 640.

In some embodiments, at block 640, statistical analysis is performed on the acceptable outcomes in a manner similar to that described with respect to block 625. Likewise, the statistical analysis may proceed iteratively, as indicated at block 645.

As illustrated at blocks 650 and 655, in some embodiments, one or more additional dimensions and/or variables, up to and including an Nth dimension and/or variable can be analyzed. As illustrated at block 660, in some embodiments, the higher order analyses can proceed iteratively.

Based on the results of a multivariate or multidimensional analysis (e.g., the analysis at blocks 620, 625, 630, 635, 640, 645, 650, 655, and/or 660), the method 600 can grant or deny access to a user at block 665. If the user is denied access, a certain number of retries can be permitted in various embodiments. In some embodiments, if the user is granted access, a record of possible outcomes can be updated with information regarding some or all of the measurements used in the acceptable outcomes, as indicated at block 670. The updated record can be used in future access attempts by the user. As with the methods 400 and 500, one or more blocks of the method 600 can be implemented by one or more software modules.

Following is a non-limiting, illustrative example that can be compatible with various embodiments described above. The example is provided by way of illustration, and is in no way meant to limit the disclosure herein.

ILLUSTRATIVE EXAMPLE

In an illustrative embodiment, biometric data is gathered from a multiplicity of biometric parameters, such as cardiac cycle signatures, fingerprints, facial scans, retinal scans, voice signatures, and vein thermal profiles. Each biometric parameter is then in turn examined for quality and acceptability. The metrics used for this assessment can vary according to the nature of the biometric.

A validation template is established based on the gathered biometric data. A test subject is tested a minimum of once and preferably several times with respect to each biometric parameter to establish an averaged baseline dataset based upon acceptable quality levels of all biometric parameters and upon weighted fusing of the biometric parameters. The averaged baseline dataset is then established as the initial comparative template, which is presumed to represent a substantially unique composite biometric signature of the subject. This initial template is used for the first access and subsequent access attempts by the test subject.

One or more datasets are obtained from the test subject and are quality normalized. Qualified biometric data is fused into a composite layered single dataset, or "fused dataset". Not all parameters are weighted equally, however. Each parameter can be weighted into the fused dataset based upon its respective quality score, its relative uniqueness as a biometric marker, and/or its historical stability. This fusing process can render a dataset as the best possible profile of the subject at time of the data acquisition, in many cases.

It is possible for a second dataset acquired immediately after a first dataset to be significantly different from the first dataset, and yet both datasets may successfully authenticate the test subject. For example, if a first dataset of a subject's cardiac cycle is taken on a subject immediately after some sort of physical exertion, the subject's heart rate and cardiac signature may be outside the bounds of normalcy, and the quality metrics of the data may be relatively low. The influence of the first dataset on the fused dataset may thus be minimal or void. If the second dataset is taken a short time later, once the subject's heart has returned to a resting rhythm, the cardiac cycle may fall inside the bounds set by a weighting matrix and can in turn add significantly to the overall fused dataset. The weighting matrix can initially be determined statistically (e.g., from a representative population) and may be dynamically adjusted once established.

If the test subject successfully acquires access, the comparison template is updated. Generally, the dataset that is most recently added to the comparison template most closely reflects the current physiological state of the test subject. The possibility exists however that the most recent dataset, although acceptable to grant access, may still suffer from small short term perturbations. Such perturbations could include temporary illness (for example, a cold could anomalously lower a test subject's voice) or other artifacts. The effects of such perturbations can be reduced by using temporal weighted average of the data in the comparison template. For example, the last dataset successfully completed can be given a preferential weight (e.g., 20%), the second-to-last can be given a less prominent weight (e.g., 15%), and so on out to the extent of the weighting matrix. The comparison template can thus constitute a dynamic system capable of tracking the physiological changes in a test subject.

In some cases, a fusion matrix used in conjunction with the comparison template may benefit from a temporal weighting adjustment as well. For example, certain characteristics of the cardiac cycle are more pronounced in a younger person or a person of good physical fitness than in older individuals. The biometric measurements associated with the cardiac cycle may thus provide a more unique signature in the fused dataset for a test subject when the test subject is young or in good physical fitness than it does for the same subject later in life or in a lesser state of fitness. Dynamic adjustments to the fusion matrix based on such changes to the test subject can thus permit the fusion matrix to correlate with the test subject in a substantially unique manner.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated. Moreover, any acceptable variation of a given embodiment is contemplated. For example, certain methods may include more or fewer steps than are described or illustrated in the drawings. The scope of the inventions, therefore, is defined by the claims.

The invention claimed is:

1. A method of authentication, the method comprising:
obtaining from a user a plurality of first measurements corresponding to a first biometric parameter, wherein at least some of the first measurements are obtained at different times;

obtaining from the user a plurality of second measurements corresponding to a second biometric parameter, wherein at least some of the second measurements are obtained at different times;

analyzing the plurality of first measurements to obtain a first correlation value of the first measurements using a computing device;

analyzing the plurality of second measurements to obtain a second correlation value of the second measurements;

combining the first and second measurements into a first composite dataset in which the first measurements are weighted according to the first correlation value and the second measurements are weighted according to the second correlation value;

obtaining a first test measurement corresponding to the first biometric parameter;

obtaining a second test measurement corresponding to the second biometric parameter;

providing a confidence level of user authentication based on a comparison of the first and second test measurements with the first composite dataset;

supplementing the plurality of first measurements with the first test measurement if the confidence level is above a first threshold value; and withholding the second test measurement from augmenting the plurality of second measurements when the confidence level is above the first threshold value and below a second threshold value.

2. The method of claim 1, further comprising granting the user access to a first restricted destination if the confidence level is above a first threshold value.

3. The method of claim 2, further comprising denying the user access to a second restricted destination if the confidence level is above the first threshold value and below the threshold value.

4. The method of claim 1, further comprising augmenting the plurality of second measurements with the second test measurement if the confidence level is above the first threshold value.

5. The method of claim 1, further comprising:
analyzing the first test measurement in combination with the plurality of first measurements to obtain a third correlation value; and
supplementing the plurality of first measurements with the first test measurement if the confidence level is above a third threshold value and the third correlation value is within a predetermined range.

6. The method of claim 5 further comprising withholding the first test measurement from supplementing the plurality of second measurements if the confidence level is above the third threshold value and the third correlation value is outside the predetermined range.

7. The method of claim 1, wherein said analyzing of the plurality of first measurements comprises weighting the first measurements according to a chronological order in which the first measurements were obtained such that a newer measurement is weighted more heavily than an older measurement.

8. The method of claim 7, wherein said analyzing of the plurality of second measurements comprises weighting the second measurements according to a chronological order in which the second measurements were obtained such that a newer measurement is weighted more heavily than an older measurement.

9. The method of claim 1, wherein said comparison of the first and second test measurements with the first composite dataset comprises:

combining a weighted version of the first and second test measurements into a second composite dataset, wherein weighting of the first test measurement is based on the first correlation value and weighting of the second test measurement is based on the second composite dataset; and comparing the second composite dataset with the first composite dataset.

10. The method of claim 1, wherein said obtaining from a user a plurality of first measurements includes enrolling the user with respect to the first biometric parameter and said obtaining from a user a plurality of second measurements includes enrolling the user with respect to the second biometric parameter.

11. A method of authentication, the method comprising:
obtaining from a user a plurality of first measurements corresponding to a first biometric parameter, wherein at least some of the first measurements are obtained at different times;

obtaining from the user a plurality of second measurements corresponding to a second biometric parameter, wherein at least some of the second measurements are obtained at different times;

analyzing the plurality of first measurements to obtain a first correlation value of the first measurements using a computing device;

analyzing the plurality of second measurements to obtain a second correlation value of the second measurements;

combining the first and second measurements into a first composite dataset in which the first measurements are weighted according to the first correlation value and the second measurements are weighted according to the second correlation value;

obtaining a first test measurement corresponding to the first biometric parameter;

obtaining a second test measurement corresponding to the second biometric parameter;

providing a confidence level of user authentication based on a comparison of the first and second test measurements with the first composite dataset;

analyzing the first test measurement in combination with the plurality of first measurements to obtain a third correlation value; and supplementing the plurality of first measurements with the first test measurement if the confidence level is above a third threshold value and the third correlation value is within a predetermined range.

12. The method of claim 11, further comprising granting the user access to a first restricted destination if the confidence level is above a first threshold value.

13. The method of claim 12, further comprising denying the user access to a second restricted destination if the confidence level is above the first threshold value and below a second threshold value.

14. The method of claim 11, further comprising supplementing the plurality of second measurements with the second test measurement if the confidence level is above the first threshold value.

15. The method of claim 14, further comprising withholding the first test measurement from supplementing the plurality of second measurements if the confidence level is above the third threshold value and the third correlation value is outside the predetermined range.

16. The method of claim 11, wherein said analyzing of the plurality of first measurements comprises weighting the first measurements according to a chronological order in which the first measurements were obtained such that a newer measurement is weighted more heavily than an older measurement.

17. The method of claim 16, wherein said analyzing of the plurality of second measurements comprises weighting the second measurements according to a chronological order in which the second measurements were obtained such that a newer measurement is weighted more heavily than an older measurement.

18. The method of claim 11, wherein said comparison of the first and second test measurements with the first composite dataset comprises:

combining a weighted version of the first and second test measurements into a second composite dataset, wherein weighting of the first test measurement is based on the first correlation value and weighting of the second test measurement is based on the second composite dataset; and comparing the second composite dataset with the first composite dataset.

19. The method of claim 1, wherein said obtaining from a user a plurality of first measurements includes enrolling the user with respect to the first biometric parameter and said obtaining from a user a plurality of second measurements includes enrolling the user with respect to the second biometric parameter.

* * * * *

UNITED STATES PATENT AND TRADEMARK OFFICE
CERTIFICATE OF CORRECTION

PATENT NO.        : 8,150,108 B2
APPLICATION NO.   : 12/050077
DATED             : April 3, 2012
INVENTOR(S)       : Miller It is certified that error appears in the above-identified patent and that said Letters Patent is hereby corrected as shown below:

Title page 2, US PATENT DOCUMENTS reads, "6,628,809 B1 9/2003 Miller et al." which should read, "6,628,809 B1 9/2003 Rowe et al."

Title page 2, US PATENT DOCUMENTS reads, "2005/0223234 A1 10/2005 McOwan et al." which should read, "2005/0223234 A1 10/2005 McOwen et al."

Title page 3, Column 1, OTHER PUBLICATIONS reads, "Office Action for U.S. Appl. No. 12/563,933, filed Sep. 21, 2099..." which should read, "Office Action for U.S. Appl. No. 12/563,933, filed Sep. 21, 2009..."

Column 1, Line 9 reads, "...method of identification..." which should read, "...methods of identification..."

Column 1, Line 25 reads, "FIG. 4 is flow chart depicting..." which should read, "FIG. 4 is a flow chart depicting..."

Column 5, Line 19 reads, "...placement of hair, spacing between elements..." which should read, "...placement of hair, and spacing between elements..."

Column 6, Lines 14-15 read, "...the one or more storage device..." which should read, "...the one or more storage devices..."

Column 8, Line 67 reads, "...in general, than is than hair color." which should read, "...in general, than is hair color."

Column 14, Lines 23-24 read, "...at least some weight when in authenticating a user." which should read, "...at least some weight in authenticating a user."

Signed and Sealed this
Tenth Day of July, 2012

David J. Kappos
*Director of the United States Patent and Trademark Office*

CERTIFICATE OF CORRECTION (continued)
U.S. Pat. No. 8,150,108 B2

Column 16, Line 64 reads, "...a comparison of incomplete dataset..." which should read, "...a comparison of the incomplete dataset..."

Column 17, Line 9 reads, "...access to the a destination requiring a..." which should read, "...access to a destination requiring a..."

Column 17, Lines 12-13 read, "...parameters be present in the dataset..." which should read, "...parameters to be present in the dataset..."

Column 18, Line 22 reads, "(e.g. 5,10,15,20..." where the numbers are in bold print, which should read, "(e.g. 5,10,15, 20..." where the numbers are not in bold print.

Column 19, Line 47 reads, "...one or more software modules..." which should read, "...one or more software modules."

Column 23, Lines 34-35 read, "...below the threshold value." which should read, "...a second threshold value."

Column 26, Line 7 reads, "The method of claim 1..." which should read, "The method of claim 11..."